(12) United States Patent
Miller et al.

(10) Patent No.: US 7,183,515 B2
(45) Date of Patent: Feb. 27, 2007

(54) SYSTEMS AND METHODS FOR PLASMA JETS

(75) Inventors: Daniel N. Miller, Bainbridge Island, CA (US); Paul D. McClure, Fort Worth, TX (US); Charles J. Chase, Sherman Oaks, CA (US); Robert R. Boyd, Santa Clarita, CA (US)

(73) Assignee: Lockhead-Martin Corporation, Bethesda, MD (US)

( * ) Notice: Subject to any disclaimer, the term of this patent is extended or adjusted under 35 U.S.C. 154(b) by 0 days.

(21) Appl. No.: 11/018,708

(22) Filed: Dec. 20, 2004

(65) Prior Publication Data
US 2006/0131282 A1 Jun. 22, 2006

(51) Int. Cl.
*B23K 10/00* (2006.01)
(52) U.S. Cl. .............. 219/121.5; 315/111.61
(58) Field of Classification Search .......... 219/121.5, 219/121.52, 121.37, 121.48, 121.59; 204/298.41; 118/50.1, 620, 715, 721, 723 MR; 315/39, 315/111.41, 111.81, 111.71, 111.61
See application file for complete search history.

(56) References Cited

U.S. PATENT DOCUMENTS

| | | | | |
|---|---|---|---|---|
| 3,150,483 A | * | 9/1964 | Mayfield et al. | 60/202 |
| 3,183,403 A | * | 5/1965 | Hurwitz, Jr. et al. | 315/111.61 |
| RE34,806 E | * | 12/1994 | Cann | 427/446 |
| 2005/0121607 A1 | * | 6/2005 | Miller et al. | 250/287 |

* cited by examiner

*Primary Examiner*—Quang Van
(74) *Attorney, Agent, or Firm*—Koestner Bertani LLP; Mary Jo Bertani

(57) ABSTRACT

A plasma jet system includes a housing with an opening. A plasma generator is coupled to ionize a fluid in the housing. An electromagnetic accelerator is coupled to generate an electric field that accelerates ionized fluid in the housing toward the opening. A controller can modulate the frequency of the electric field to cause the ionized fluid to form a plasma vortex flow through the opening. A magnetic field is applied normal to the direction of the plasma vortex flow to mitigate the momentum of the electrons. The electrons slowed by the magnetic field can be collected and conducted to a location where they are re-inserted into the plasma vortex flow to maintain charge neutrality.

19 Claims, 5 Drawing Sheets

SYSTEMS AND METHODS FOR PLASMA JETS

BACKGROUND

Active flow control involves modification of the turbulent structure of eddies in most complex flows with the intent to improve aerodynamic performance of air vehicle flight control and propulsion systems. Such capability can increase range and maneuverability, reduce acoustic loads, signature, weight, and cost. In some systems, a relatively small amount of high-momentum secondary fluid is used to enhance the naturally occurring instabilities of the main flow. For example, it is known to use active flow control in applications such as favorably influencing the flow over an aerodynamic surface, heating/cooling components, vectoring a primary fluid flow, and mixing fluids.

One type of device that can be used for active flow control in subsonic systems is referred to as a zero-net-mass jet. A typical zero-net-mass jet actuator comprises a housing defining an internal chamber. An orifice is present in a wall of the housing. The actuator further includes a mechanism in or about the housing for periodically changing the volume within the internal chamber so that a series of fluid vortices are generated and projected in an external environment out from the orifice of the housing. Various volume changing mechanisms are known, for example a piston positioned in the jet housing to move so that fluid is moved in and out of the orifice during reciprocation of the piston, or a flexible diaphragm as a wall of the housing. The flexible diaphragm is typically actuated by a piezoelectric actuator or other appropriate means.

Typically, a control system is utilized to create time-harmonic motion of the diaphragm. As the diaphragm moves into the chamber, decreasing the chamber volume, fluid is intermittently ejected from the chamber through the orifice. As a quantity of fluid passes through the orifice, the flow separates at the sharp edges of the orifice and creates a shear layer, which rolls up into a vortex sheet or ring. As each intermittent quantity of fluid is emitted, a separate vortical structure is generated creating a train of vortices moving away from the orifice. These vortices move away from the edges of the orifice under their own self-induced velocity. As the diaphragm moves outward with respect to the chamber, increasing the chamber volume, ambient fluid is drawn from all directions around the orifice into the chamber. Since the vortices are already removed from the edges of the orifice, they are not affected by the ambient fluid being entrained into the chamber. As the vortices travel away from the orifice, they synthesize a jet of fluid, a "zero-net-mass jet," through entrainment of the ambient fluid.

However, piezoelectric diaphragms used to form zero-net-mass jets are generally unreliable due to moving parts and cause vibration in devices in which they are installed. Further, the amplitude, temperature, and frequency at which the diaphragms can operate is limited, with the result that piezoelectrically-driven zero-net-mass jets generate limited jet velocity and have little practical application in flows above approximately Mach 0.3.

In physics and chemistry, plasma (also called an ionized gas) is an energetic state of matter in which some or all of the electrons in the outer atomic orbital rings have become separated from the atom. Excitation of a plasma requires partial ionization of neutral atoms and/or molecules of a medium. There are several ways to cause ionization including collisions of energetic particles, strong electric fields, and ionizing radiation. The energy for ionization may come from the heat of chemical or nuclear reactions of the medium, as in flames, for instance. Alternatively, already released charged particles may be accelerated by electric fields, generated electromagnetically or by radiation fields.

There are two broad categories of plasma, hot plasmas and cold plasmas. In a hot plasma, full ionization takes place, and the ions and the electrons are in thermal equilibrium. A cold plasma (also known as a weakly ionized plasma) is one where only a small fraction of the atoms in a gas are ionized, and the electrons reach a very high temperature, whereas the ions remain at the ambient temperature. These plasmas can be created by using a high electric field, or through electron bombardment from an electron gun, and other means . . .

SUMMARY

In some embodiments, a plasma jet system is disclosed that includes a housing with an opening. A plasma generator is coupled to ionize a fluid in the housing. An electromagnetic accelerator is coupled to generate an electric field that accelerates ionized fluid in the housing toward the opening. A controller can modulate the frequency of the electric field to cause the ionized fluid to form a plasma vortex flow through the opening. A magnetic field is applied normal to the direction of the plasma vortex flow to mitigate the momentum of the electrons. The electrons slowed by the magnetic field can be collected and conducted to a location where they are re-inserted into the plasma vortex flow to maintain charge neutrality. The plasma jet system has no moving parts and no change in mass flow volume is required to create the plasma flow.

The foregoing has outlined rather broadly the features and technical advantages of embodiments of the present invention so that those skilled in the art may better understand the detailed description of embodiments of the invention that follows.

BRIEF DESCRIPTION OF THE DRAWINGS

Embodiments disclosed herein may be better understood, and their numerous objects, features, and advantages made apparent to those skilled in the art by referencing the accompanying drawings. The use of the same reference symbols in different drawings indicates similar or identical items.

DETAILED DESCRIPTION OF THE DRAWINGS

What is desired is a fixed-volume zero-net-mass jet actuator with sufficient momentum and control authority that can be used to actively control high velocity flows in a variety of applications, such as engines, aerodynamic surfaces, mixing, and heating and cooling. Embodiments disclosed herein provide a plasma flow accelerated through an electric field to create a high speed, steady and/or high frequency pulsed plasma jet. The plasma jet can be configured to control flow without diverting a portion of the primary flow or requiring an auxiliary flow source.

Figure 1:
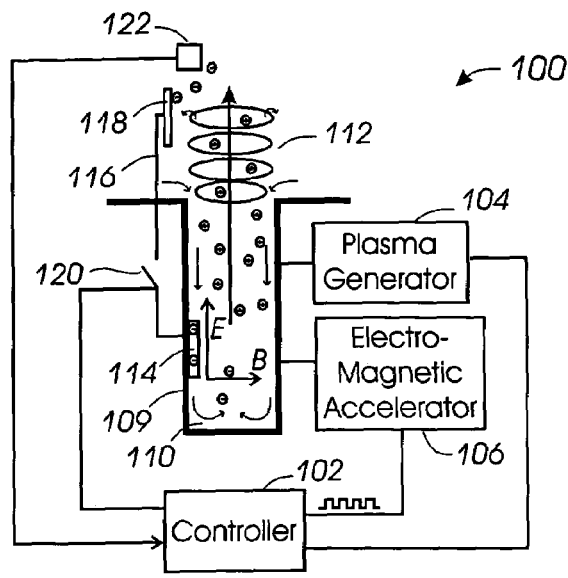
FIG. 1 is a diagram of an embodiment of a plasma jet system.

FIG. 1 shows a diagram of components that can be included in some embodiments of plasma jet system 100, including controller 102 coupled to operate plasma generator 104 and electromagnetic accelerator 106. Plasma generator 104 can be configured to generate plasma in housing 109. Cavity 110 in housing 109 is formed with at least one opening. Electromagnetic accelerator 106 can be configured to generate an electric field E and a magnetic field B. The electric field E accelerates the plasma within cavity 110 toward an opening in housing 109, while the electrons (indicated by "−" symbols) are accelerated in the opposite direction. Controller 102 modulates the frequency of the electric field E to cause ionized fluid (indicated by "+" symbols) to form a pulsed plasma vortex flow 112 through the opening.

The magnetic field B is applied normal to the direction of the plasma jet and creates a large force on the electrons. The force of magnetic field B mitigates the momentum of the electrons, which aids collection of the electrons by positive electrical terminal 114, such as a cathode. Positive terminal 114 can be coupled to a conductive element 116 and configured to transport the electrons to a location downstream of plasma vortex flow 112. A negative terminal 118 such as an anode can be coupled to the other end of conductive element 116 at a downstream location, where the electrons can be re-inserted into plasma vortex flow 112 to help neutralize the charge of flow 112. A switch 120 can be coupled between conductive element 118 and controller 102. Controller 102 can be configured to receive information from one or more sensor(s) 122 regarding the characteristics of flow 112 at some downstream location, and control operation of plasma generator 104 and electromagnetic accelerator 106.

Controller 102 can operate electromagnetic accelerator 106 to provide a steady or a pulsed electric field. When a pulsed electric field is applied, a series of plasma vortices issue from an opening in cavity 110, shown as plasma vortex flow 112. The strength and/or the pulse frequency of the electric field can be varied, depending on the force required from plasma vortex flow 112.

Controller 102 is typically implemented with a processing system that can be embodied in any suitable computing device(s) using any suitable combination of firmware, software, and/or hardware, such as microprocessors, Field Programmable Gate Arrays (FPGAs), Application Specific Integrated Circuit (ASICs), or other suitable devices. Controller 102 can be coupled to a power supply (not shown) to control power supplied to plasma generator 104 and electromagnetic accelerator 106. Sensor(s) 122 can also provide information regarding the velocity, pressure, temperature, and other characteristics of flow 112 to controller 102 to operate electromagnetic accelerator 106 and plasma generator 104.

Any suitable component or combination of components can be used for controller 102, plasma generator 104, electromagnetic accelerator 106, positive terminal 114, negative terminal 118, conductor 116, and sensor(s) 122. For example, plasma generator 104 can be implemented by strong electric fields, electron beams, microwaves, and other phenomena and/or components capable of generating plasma. Electromagnetic accelerator 106 can be implemented with one or more suitable device(s) capable of generating an electrical field transverse to a magnetic field.

Figure 2A:
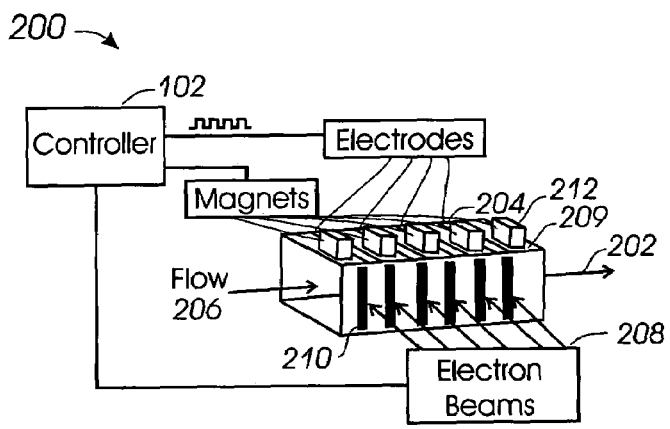
FIGS. 2A and 2B show diagrams of another embodiment of a plasma jet system.
Figure 2B:
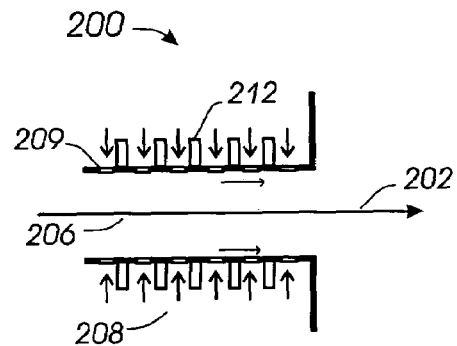

FIGS. 2A and 2B show perspective and side cut-away views, respectively, of an embodiment of another plasma jet system 200 configured to generate a continuous plasma jet 202. Controller 102 is coupled to regulate electrodes 204 to generate an electric field that accelerates flow 206 to form plasma jet 202. Electrodes 204 may be pulsed at one or more desired frequencies, and/or operated to apply a continuous electric field. The functions of plasma generator 104 (FIG. 1) can be performed by electron beams 208 being injected into cavity 110 of housing 209 through electron beam windows 210 to ionize flow 206. Windows 210 may be heated by electron beams 208, and are of sufficient mechanical strength for the environment in which housing 209 is utilized. Any suitable type of window 210 can be utilized. For example, in some configurations, thin metallic foils with passive cooling can be utilized for windows 210. In other configurations with electron beams 208 of relatively high current densities, either active cooling or plasma windows can be utilized. Windows 210 typically comprise only a portion of one or more walls of housing 209. For example, FIGS. 2A and 2B shows windows 210 as a series of rectangular strips in opposing sidewalls, however any suitable number, shape, and configuration of windows 210 can be used. The amount of plasma generated can also be varied, as required, by controlling generation of electron beams 208.

Housing 209 can be configured with one or more magnet devices 212 that can be operated by controller 102 to create a transverse magnetic field normal to the direction of the electric field. Electrodes 204 and magnet devices 212 together perform at least some of the functions of electromagnetic field generator 106 (FIG. 1). Magnetic devices 212 such as permanent magnets, electromagnets, and/or superconducting magnets can be used to generate a magnetic field that is aligned approximately normal to the electric field E and flow 206. Other suitable devices for generating a magnetic field can be used, in addition to, or instead of, magnet devices 212. Additionally, although magnet devices 212 are shown distributed over the length of housing 209, one or more magnet devices 212 can be positioned in any one or more suitable locations relative to housing 209 or portions of housing 209.

Housing 209 is open at both ends to allow flow 206 to enter one end and plasma jet 202 to exit the other end. Flow 206 can be any suitable liquid, gaseous, and/or solid substance(s) supplied from any suitable source(s). For example, flow 206 can be supplied from a secondary or auxiliary source such as a tank of compressed gas or fluid (not shown). Flow 206 can also be supplied by diverting a portion of a primary flow in addition to, or instead of, being supplied from a secondary source. Electron beams 208 can increase the ionization of flow 206, which can be supplied as a non-ionized, partially ionized, or fully ionized substance, as required.

Figure 3A:
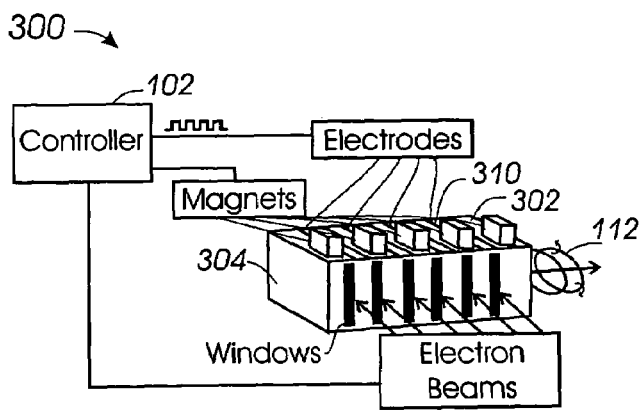
FIGS. 3A and 3B show diagrams of another embodiment of a plasma jet system.
Figure 3B:
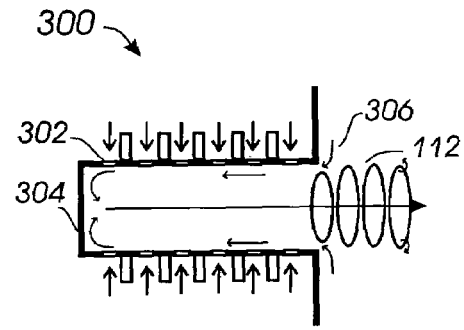

FIGS. 3A and 3B show perspective and side cut-away views, respectively, of an embodiment of plasma jet system 300 that is similar to plasma jet system 200 (FIGS. 2A and 2B), except housing 302 includes a closed end 304, and an open end through which flow 306 enters, and plasma vortex flow 112 exits. Plasma jet system 300 is referred to as a zero-net-mass system because flow 306 is drawn in by reduced pressure created in housing 302 by the flow of plasma vortex flow 112 out of housing 302.

Figure 3C:
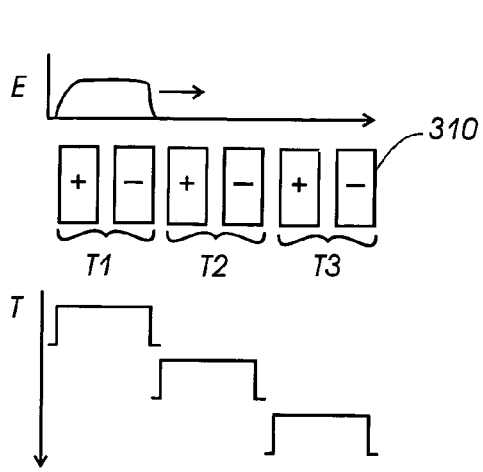
FIG. 3C shows pairs of electrodes that can be activated and deactivated in series to generate an electric field to accelerate the plasma.

Referring to FIGS. 3A and 3C, electrodes 310 can be arranged in electrode pairs with alternating polarity. Controller 102 can activate and deactivate each pair of electrodes 310 in series over a period of time. For example, at time T1, a first pair of electrodes 310 is activated. At time T2, the first pair of electrodes 310 is deactivated and the second pair of electrodes 310 is activated. At time T3, the second pair of electrodes 310 is deactivated and the third pair of electrodes 310 is activated, and so on. When the last pair of electrodes 310 is deactivated, the first pair can be activated to begin the series over again, causing a wave of pulsing electric field E to "travel" through housing 302. Such an arrangement of electrodes 310 can be used in various embodiments of plasma jet systems, including systems 100 (FIG. 1), 200 (FIG. 2), and 400 (FIG. 4), as well as system 300.

Figure 4:
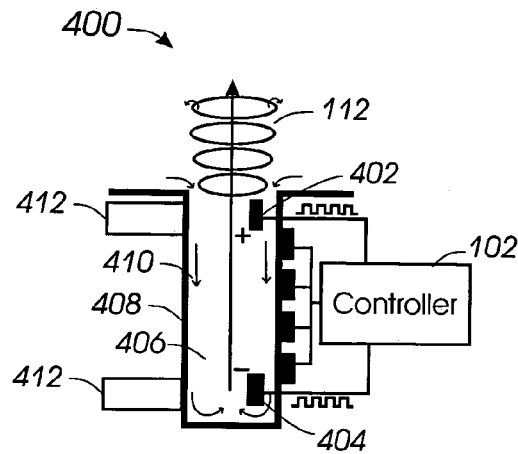
FIG. 4 is a diagram of another embodiment of a plasma jet system.

FIG. 4 shows an embodiment of another plasma jet system 400 configured with electrodes 402, 404 of opposing polarity positioned within cavity 406 at either end of housing 408. Controller 102 is configured to output pulsed driver signals to electrodes 402, 404 to create the electric field that accelerates the ionized fluid into a jet of plasma vortex flow 112. Further, one or more electrodes 402 can also be used to generate the plasma or ionized flow 410. Additional electrodes 402, 404 can be used to accelerate plasma. Note that any suitable device(s) for generating an electric field can be used, in addition to, or instead of, electrodes 204. Magnetic field generators 412 are shown near the top and bottom of housing 408 to attract electrons, however, magnetic field generators 412 can be positioned in any suitable location relative to housing 408.

Note that various embodiments of plasma jet systems 100 (FIG. 1), 200 (FIG. 2), 300 (FIG. 3), and 400 (FIG. 4) do not require moving mechanical components to create a jet of plasma vortex flow 112. Electromagnetic accelerator 106 can be pulsed at frequencies above those that can be achieved with mechanical components in other types of zero-net-mass jets. Additionally, the strength of the electric field E in cavity 110, and the ionization of flow 206, 306, can be adjusted to achieve plasma vortex flow 112 with much higher velocity than zero-net-mass jets generated by mechanical systems. Plasma jet systems 100, 200, 300, 400 can be configured with components that can withstand very high speeds and temperatures. Accordingly, plasma vortex flow 112 can be generated to control flow at hypersonic temperatures and speeds, as well as lower temperatures and speeds.

The ability to manipulate and control fluid flows with plasma jet systems has tremendous potential for improving system performance in diverse technological applications, including: mixing and combustion processes, boundary layer flow of aerodynamic surfaces, pressure shock stabilization, engine inlet boundary layer diversion, inlet duct secondary flow control, and thrust management, among others. Shear flow is typically receptive to small disturbances within a limited frequency band and, as a result, these disturbances are rapidly amplified and lead to substantial modification of the primary flow and the performance of the system in which it is employed.

Figure 5:
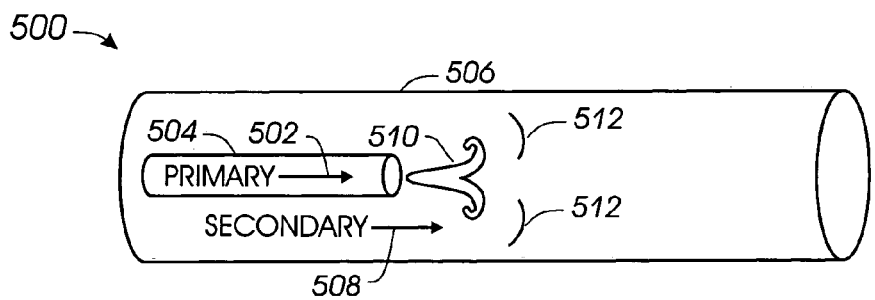
FIG. 5 is a diagram of an embodiment of a plasma injector.

Referring to FIG. 5, an embodiment of a pulsed plasma injector 500 is shown including a high-velocity plasma jet 502 pulsed through a primary nozzle 504 contained within shroud 506. The mixing between plasma jet 502 and secondary fluid 508 is a viscous process that tends to dissipate energy. Pulsing plasma jet 502 reduces the dissipative effects of the mixing between plasma jet 502 and secondary fluid 508. Additionally, by pulsing plasma jet 502, a billow 510 of plasma generates one or more acoustic waves 512 in the downstream flow. Acoustic waves 512 comprises an elastic interaction with secondary fluid 508 in addition to a mixing phenomenon, achieving a more efficient transfer of energy from plasma jet 502 to secondary fluid 508. Note that controller 102, plasma generator 104 and electromagnetic accelerator 106 (FIG. 1) can be included in pulsed plasma injector 500 to vary the frequency, duty cycle and amplitude of plasma jet 502 in order to control the efficiency of system 600.

Figure 6:
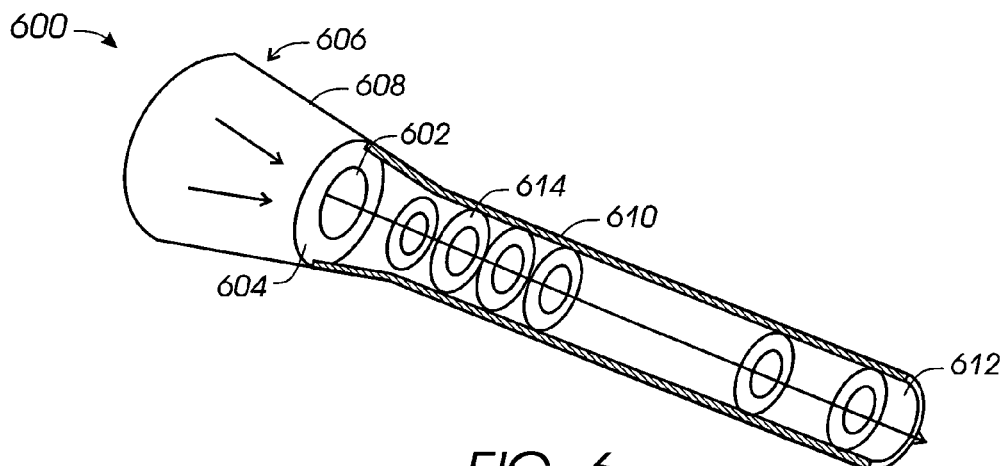
FIG. 6 is a diagram of an embodiment of a plasma jet system.

Another embodiment of a plasma jet system 600 is shown in FIG. 6, including a high-pressure plasma source 602 contained within an inner nozzle 604. Shroud 606 includes a convergent portion 608 followed by a nozzle portion 610 with an opening at exit end 612. In some embodiments, nozzle portion 610 can be divergent, convergent, have a substantially constant cross-section, or a combination of shapes. The geometry of convergent portion 608 and nozzle portion 610 can be determined by properties of the primary flow and secondary fluid. The ratio of a cross-sectional area of inner nozzle 604 to cross-sectional area of shroud 606 can be selected so that said primary flow dissipates within the boundaries of shroud 606.

In the embodiment shown, inner nozzle 604 is positioned in convergent portion 608 of shroud 606. Plasma vortex flow 614 forms a primary flow that mixes with a secondary fluid in nozzle portion 610. The efficiency of the mixing is affected by several variables such as the pulsing frequency and amplitude of plasma vortex flow 614, and the length and cross-sectional geometry of nozzle portion 610. In some embodiments, the length of nozzle portion 610 can be based on a harmonic of the frequency of plasma vortex flow 614.

Plasma jet system 600 can be used in a variety of industrial applications such as a smokestack, where it may be desirable to direct a plume of a smokestack with ejectors to drive the smoke and exhaust in a certain direction. Plasma jet system 600 can be used to pump additional mass flow in an engine, or in the ventilation or environmental control system of a machine or vehicle. In some embodiments, plasma jet system 600 can boost pumping capacity by 100% or more over a steady-state ejector, essentially doubling the pumped mass flow. Plasma jet system 600 can also be used to cool electronic equipment, as well as other devices.

In other embodiments, a series of nested plasma jet systems 600 can be included to form two or more stages of mixing. In still further embodiments, multiple plasma jet systems 600 can be included in the same stage to increase the amount of fluids that are mixed in the stage. Note that inner nozzle 604 can be configured with an open housing 202 (FIG. 2B) or closed housing 302 (FIG. 3B), depending on whether plasma jet system 600 is intended to be zero net mass flow or not. Additionally, controller 102, plasma generator 104 and electromagnetic accelerator 106 (FIG. 1) can be included in plasma jet system 600 to vary the frequency, duty cycle and amplitude of plasma vortex flow 614 in order to control the efficiency of plasma jet system 600.

Figure 7A:
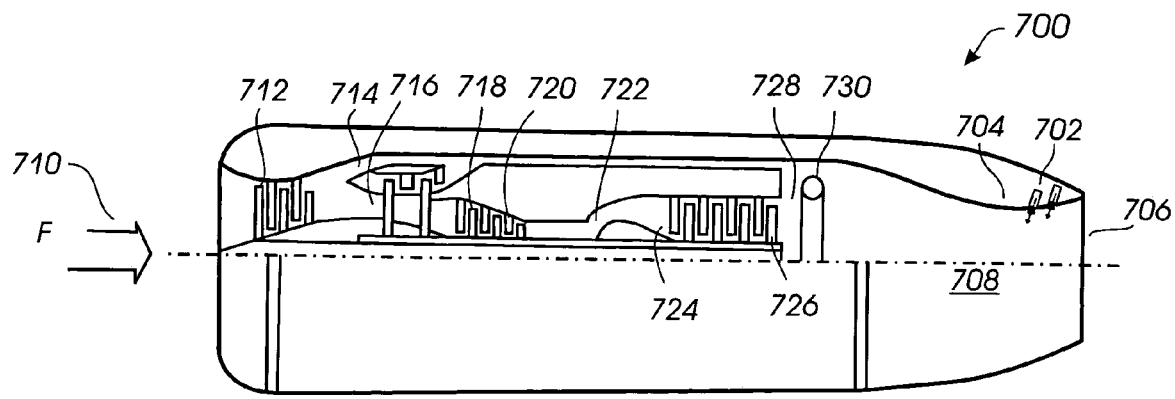
FIG. 7A shows an embodiment of engine configured with plasma jets to vector fluid flow at the throat and/or exit areas of a nozzle.

FIG. 7A shows an embodiment of engine 700 configured with plasma jets 702 to vector fluid flow at the throat 704 and/or exit areas 706 of nozzle 708. As primary flow 710 of air enters jet engine 700 through fan section 712, comprised of a plurality of rotating fan blades, pushes flow 710 into bypass section 714 and compressor section 716. Compressor section 716 is comprised of a plurality of compressor blades 718, 720 which compress flow 710 into combustion chamber 722. Fuel is mixed with flow 710 in combustion chamber 722 and ignited, thereby adding energy to flow 710, increasing the temperature of flow 710 in combustion chamber 722. Pressure within combustion chamber 722 forces flow 710 into turbine section 724, which is comprised of a plurality of turbine blades 726. Turbine section 724 removes some energy from flow 710 to power compressor section 728 and turbine section 724. Flow 710 then passes into exhaust chamber 718 where it combines wit the flow from bypass section 714. An afterburner 730 can provide additional fuel, which can be ignited to increase the energy of flow 110. Flow 710 is then expelled from engine 700 through exit 706 as an exhaust flow.

Engine 700 creates thrust related to the velocity of the mass and density of the air of flow 710 over a given time period. Typically, in a jet engine, flow 710 is a subsonic flow of air until it reaches throat 704. Nozzle 708 cooperates with exit 706 to accept flow 710 from exhaust chamber 728 and to accelerate exhaust flow 710 to higher velocities, typically supersonic velocities. To achieve optimum acceleration of the exhaust flow, nozzle 708 converges the flow at throat 704, which is the point or section in nozzle 708 having the smallest cross sectional area, the constriction of throat 704 typically accelerating flow 710 to a sonic velocity, and a supersonic velocity after throat 704. Constriction of flow 710 at throat 270 operationally translates energy in flow 710 from pressure and temperature into velocity, thus creating thrust opposite to the vector of flow 710 as flow 710 exits nozzle 708. Although nozzle 708 is depicted as a fixed geometry nozzle, it should be understood that variable geometry nozzles could be incorporated in engine 700 to enhance control of the exhaust flow.

Figure 7B:
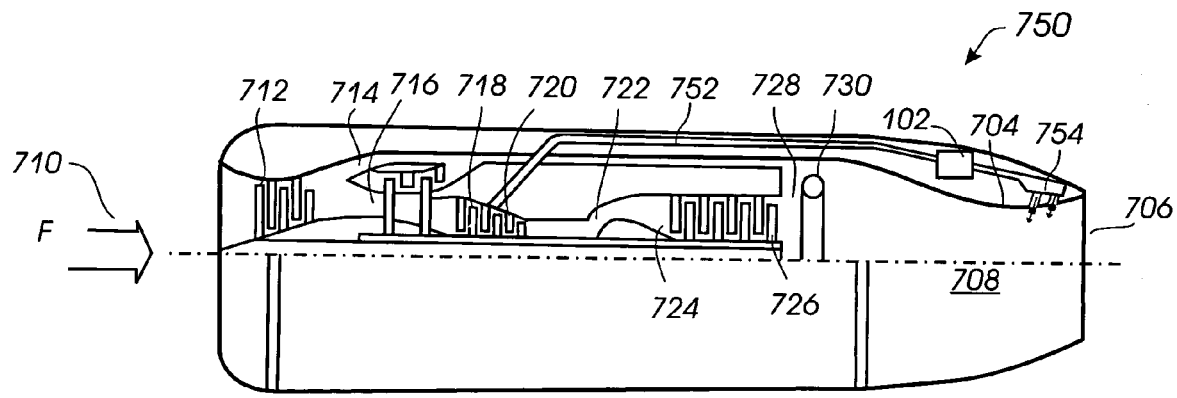
FIG. 7B shows an embodiment of engine configured with a duct to collect high-pressure air from flow at compressor section and provide the high-pressure flow to plasma jets.

Note that pulsed plasma jets 702 are shown as zero net mass flow jets with a cavity closed at one end, similar to housing 302 shown in FIG. 3B. FIG. 7B shows an embodiment of engine 750 configured with duct 752 to collect high-pressure air from flow 710 at compressor section 718 and provide the high-pressure flow 710 to plasma jets 754. Duct 752 can include components to ionize flow 710 as it is delivered to jets 754. Plasma jets 754 can further ionize the flow, if necessary, as the flow is accelerated through a magnetic field and injected into nozzle 708. A magnetic field may be used to mitigate electron momentum and aid the collection f electrons by an electrode for reinsertion into the bulk mass flow to maintain charge neutrality of the flow.

In alternative embodiments, duct 752 can collect air from bypass section 714, combustion chamber 722 or any other portion of engine 750 having high-pressure air. In an alternative embodiment, a separate compressor (not shown) can provide high-pressure fluid to duct 752. Controller 102 controls operation of plasma jets 754, and the flow pressurized fluid in duct 752. One or more ducts 752 can be included to provide compressed air to two or more opposing jets 754 located in nozzle 708 and/or other portions of engine 750.

Figure 8:
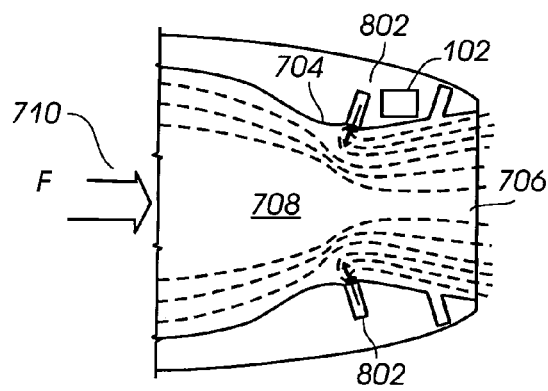
FIG. 8 shows an embodiment of a nozzle with plasma jets located to reduce the effective cross sectional area of nozzle throat.

In both engines 700 and 750, plasma jets 702, 754 can be located at different positions to affect different performance parameters of engines 700, 750. Additionally, the pulse frequency and amplitude of plasma jets 702, 754 can be varied to optimize performance. For instance, referring to FIG. 8, plasma jets 802 can be located and operated to reduce the effective cross sectional area of nozzle throat 704 to enhance the acceleration of exhaust flow 710 as it exits from exhaust chamber 728 through exit 706. Controller 102 can direct opposing plasma jets 802 to inject a pulsed secondary flow having mass flow and pulse characteristics adequate to effectively decrease the cross sectional area of throat 704 to not only ensure proper acceleration of exhaust flow 710, but also to throttle flow 710 to control the pressure and temperature within exhaust chamber 728. If jets 802 inject a secondary flow with similar characteristics, flow 710 can be accelerated without changing its vector (direction) at exit 706.

When engines 700, 750 are operated at varying power settings, the energy level of flow 710 is varied by, for instance, fluctuation of the amount of fuel in combustion chamber 722. A greater energy level added to flow 710 increases the pressure and temperature in exhaust chamber 728. Typically, jet engines 700, 750 increase the cross sectional area of the nozzle when afterburner is selected. At high flow energy levels, controller 102 can direct plasma jets 802 to provide a secondary flow with decreased blockage of throat 704 to reduce pressure in exhaust chamber 728. When the energy level of flow 710 is maximized by providing fuel into exhaust chamber 728 with afterburner 730, the exhaust flow in exhaust chamber 728 can create an over-pressure which can cause a backflow through turbine section 718 and, in extreme situations, bypass chamber 714. To minimize the effects of the backpressure created in exhaust chamber 728 by initiation of afterburner 730, controller 102 can direct plasma jets 802 to provide no or just minimal blockage of throat 704, thus effectively increasing the cross sectional area of throat 704.

Plasma jets 702, 754 can be incorporated into various nozzle designs, including an axisymmetric, rectangular (2-D), elliptical, diamond, triangular shapes, and low observable RADAR and IR configurations. Plasma jets 802 can be formed as one or more slots that encompass all or portion(s) of the periphery of the nozzle 708 to provide a uniform flow along the entire slot from a single duct, or can include a number of smaller injection components within each slot that cooperate to provide a uniform flow or a flow that varies along the slot(s).

Figure 9:
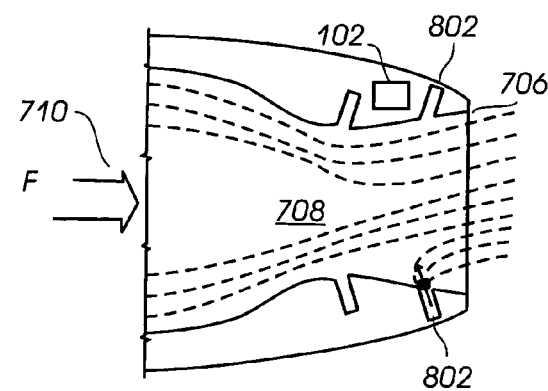
FIG. 9, an embodiment of nozzle is shown including thrust vectoring with plasma jets.

Referring now to FIG. 9, an embodiment of nozzle 708 is shown including thrust vectoring features that enhance vehicle maneuverability without requiring complex moving parts or increasing radar or infrared signatures. One or more plasma jets 802 are oriented to inject a secondary fluid at an angle opposing the direction of primary fluid flow 710 to change the direction of the exhaust thrust vector. Nozzle 708 accordingly provides a reliable, low cost, highly effective thrust vectoring solution that can be easily implemented with minimal additional weight.

In some embodiments, exit area 706 is a two-dimensional rectangular nozzle configuration. The thrust-vectoring control moments are proportional to the thrust vector deflection angle and the force exerted by the vectored primary fluid flow 710.

Plasma jets 802 can generate pitch, roll, and yaw control moments by deflecting the primary flow 710 vertically and horizontally. For single nozzle configurations, vertical deflections cause pitching moments, and horizontal deflections cause yawing moments. Multiple nozzles 708 can be positioned at desired locations relative to the axes of the vehicle so that vertical deflections cause pitching moments, differential vertical deflections cause rolling moments, and horizontal deflections cause yawing moments. In some embodiments, plasma jets 802 are disposed on opposing sidewalls. In other embodiments, one or more plasma jets 802 can be formed in only one sidewall. Plasma jets 802 can be arranged in rows having the same or a different number of plasma jets 802 in each row. Groups of plasma jets 802 can be arranged in nozzle 708 to meet the requirements for a particular use.

While plasma jets 802 can be positioned at various locations on sidewalls of nozzle 708, the greatest amount of thrust vectoring is typically achieved by positioning plasma jets 802 as close to the free stream edge of exit area 706 as possible. The force exerted by plasma jets 802 is also dependent on the diameter and the pressure of plasma vortex flow from plasma jets 802. Plasma jets 802 with larger diameters and lower pressure can achieve the same overall fluid mass flow as smaller diameters with higher pressure secondary fluid flow. Any combination of number, size, and location of plasma jets 802, and rate of secondary fluid flow, can be configured to provide the desired thrust vectoring capability.

Note that plasma jets 802 can be provided in any number of sidewalls to provide maneuvering control in the desired directions. Further, secondary flow can be injected simultaneously in two or more sidewalls to effect maneuvering control in two or more directions. It should also be noted that the position of one or more of nozzles 708 on a vehicle can be selected with respect to the vehicle's center of gravity to increase or decrease the pitch, roll, and yaw moments that can be achieved with a given amount of thrust vectoring force.

The systems depicted in FIGS. 7A–9 can perform or supplement the functions of a thrust vectoring, variable geometry nozzle to adjust the effective operating parameters of a nozzle over a jet engine's full power range. Note that although jet engines 700, 750 are used as examples of how plasma jets 702, 754 can be used to control flow, plasma jets 702, 754 can be used in other types of engines, including plasma engines, among others.

Figure 10:
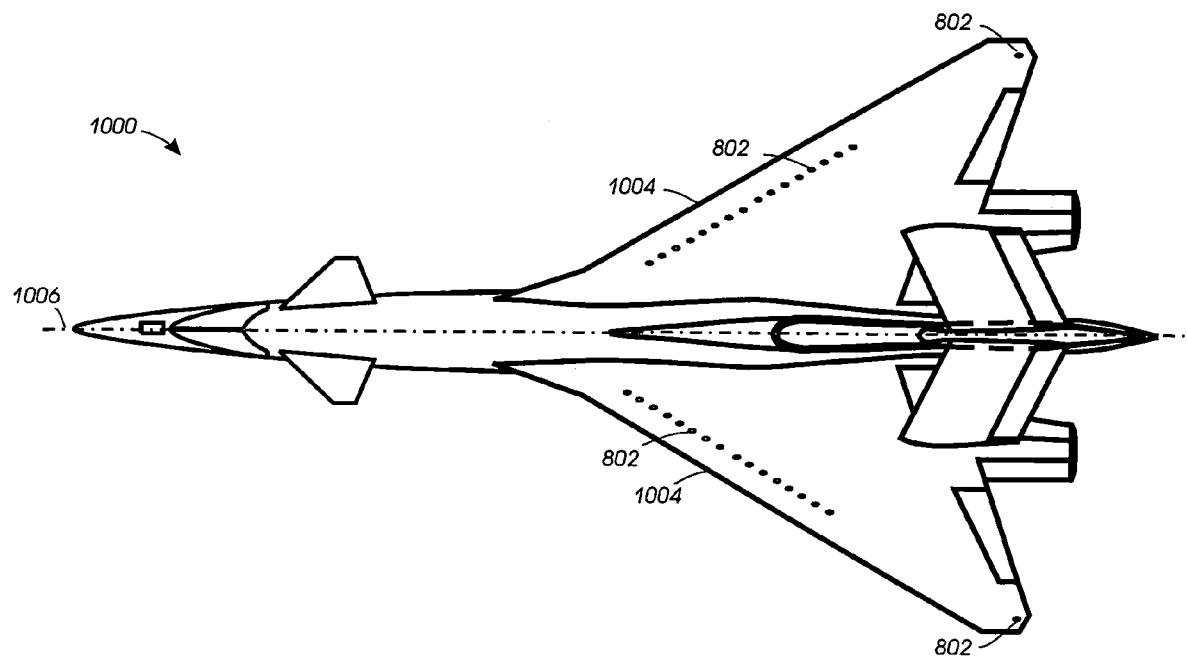
FIG. 10 shows an embodiment of aircraft with plasma jets embedded in wings.
Figure 11:
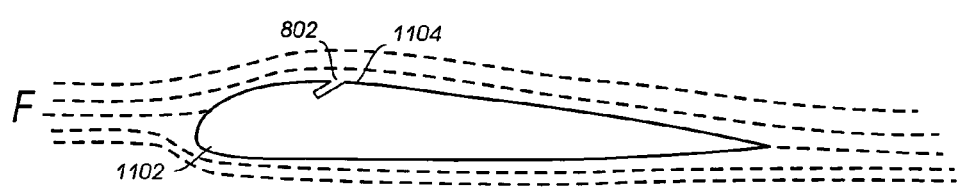
FIGS. 11 and 12 shows an embodiment of an aerodynamic surface with plasma jets that are configured to change the effective aerodynamic shape of the surface.
Figure 12:
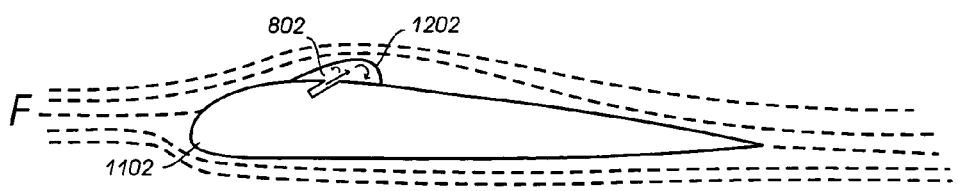

Plasma jets 802 can also be used in a wide variety of other applications, including modifying the shape of aerodynamic surfaces, such as airfoils. FIG. 10 shows an embodiment of aircraft 1000 with plasma jets 802 embedded in wings 1004. The cross-section of wings 1004 along the longitudinal axis 1006 of aircraft 1000 form an airfoil 1102, as shown in FIGS. 11 and 12, that is shaped to create a pressure difference between the upper surface (suction side) and pressure increase on the lower surface (pressure surface) to produce a lifting force. Airfoils can be used in many devices, including, but not limited to, wings, canards, horizontal and vertical stabilizers, rotor blades for propellers, fans, compressors, turbines, helicopter blades, and stator vanes for compressors and turbines. The capability to alter the aerodynamic performance of a device by altering its shape (e.g., the "camber" of an airfoil) during various phases of operation can lead to significant performance improvements.

In operation, airfoil 1102 creates a pressure difference from a suction surface on one side of airfoil 1102 to a pressure surface on an opposite side by imposing on the fluid flow a greater curvature on the suction surface than on the pressure surface. A reduction of the efficacy of airfoil results 1102, however, when the fluid flow boundary layer separates from the suction surface. One strategy for reducing the tendency toward boundary layer separation is to inject fluid into the boundary layer through jets in the suction surface. Typically, the effectiveness of this strategy increases as the velocity of the injected fluid approaches the velocity of the bulk fluid flow.

FIG. 11 depicts plasma jet 802 embedded flush with an external surface 1104 of airfoil 1102. The position of one or more plasma jets 802 along airfoil surface 1104 can be determined based on the particular effect on the freestream fluid F desired. Airfoil 1102 is shown at zero degrees with respect to fluid F, also referred to as zero degrees angle of attack, however, plasma jets 802 can also function at other angles of attack. For example, at higher angles of attack, the separation performance of wing 1004 can be controlled and/or tailored by appropriate placement and operation of plasma jets 802. Note that plasma jets 802 can be oriented to inject fluid at any desired angle relative to fluid F.

FIG. 12 shows plasma jet 802 in operation forming a pulsed jet flow into the freestream fluid F. When plasma jet 802 is a zero net mass flow jet, a closed recirculating flow region 1202 is formed, effectively modifying the aerodynamic shape of airfoil surface 1202. The freestream fluid F flows over the recirculating region 1202 just as if recirculating flow region 1202 were a solid part of airfoil surface 1202. Thus, the aerodynamic characteristics of airfoil 1102 can be changed by operation of plasma jet 802.

FIGS. 11 and 12 show a single plasma jet 802, however, an array of plasma jets 802 are shown in wing 1004. Other arrangements of plasma jets 802 are possible, for example, plasma jets 802 can be configured in a two-dimensional array, as well as in the lower and/or upper skin of wing 1004. Multiple plasma jets 802 can be individually addressable, and all, or only a select portion, of plasma jets 802 may be activated at one time. In this manner, the apparent aerodynamic shape of the wing 1004 may be specifically tailored for a given flight regime. If wing 1004 is configured with pressure, or other appropriate sensors, then a control computer can evaluate the forces on the wing during flight and determine the appropriate plasma jets 802 to activate in order to optimally tailor the effective aerodynamic shape of airfoil 1102.

It is anticipated that plasma jets 802 can also be used on leading and/or trailing edges of various portions of an aircraft or other device, in addition to, or instead of, conventional control surfaces, such as rudders, ailerons, flaps, elevators, among others, to control the attitude and position of the device in which plasma jets 802 are installed. For example, on an aircraft, arrays of plasma jets 802 can be positioned in both wings and operated to create higher lift on one side of the center of gravity of the aircraft than on the other. The asymmetrical lifting force will cause a rolling moment, similar to the effect of aileron deflections in a conventional aircraft. One advantage of plasma jets 802 over conventional control surfaces is the absence of hinge lines, which have a higher RADAR cross-section than plasma jets 802. Accordingly, a device that incorporates plasma jets 802 instead of conventional hinged control surfaces will be less observable with RADAR sensors.

More aft locations can also be used with plasma jets 802 pointing more directly downstream to increase lift through pressure reduction, increase L/D, delay separation and thereby increase the maximum attainable lift ($C_{Lmax}$), and even provide primary thrust for some applications. Differential application of plasma jets 802 can also be used to provide pitch, roll, and yaw control. Plasma jets 802 can also be used near leading and/or trailing edges to replace the conventional control surfaces.

In addition to the aerodynamic forces, acceleration or deceleration of the air flowing around an aircraft creates a direct thrust (or drag) force on the aircraft. The moment added to the air stream by plasma jets 802 can create a reaction force on the aircraft. This force can be a significant thrust on the vehicle, which can be applied symmetrically, or asymmetrically to provide additional control moments.

Figure 13:
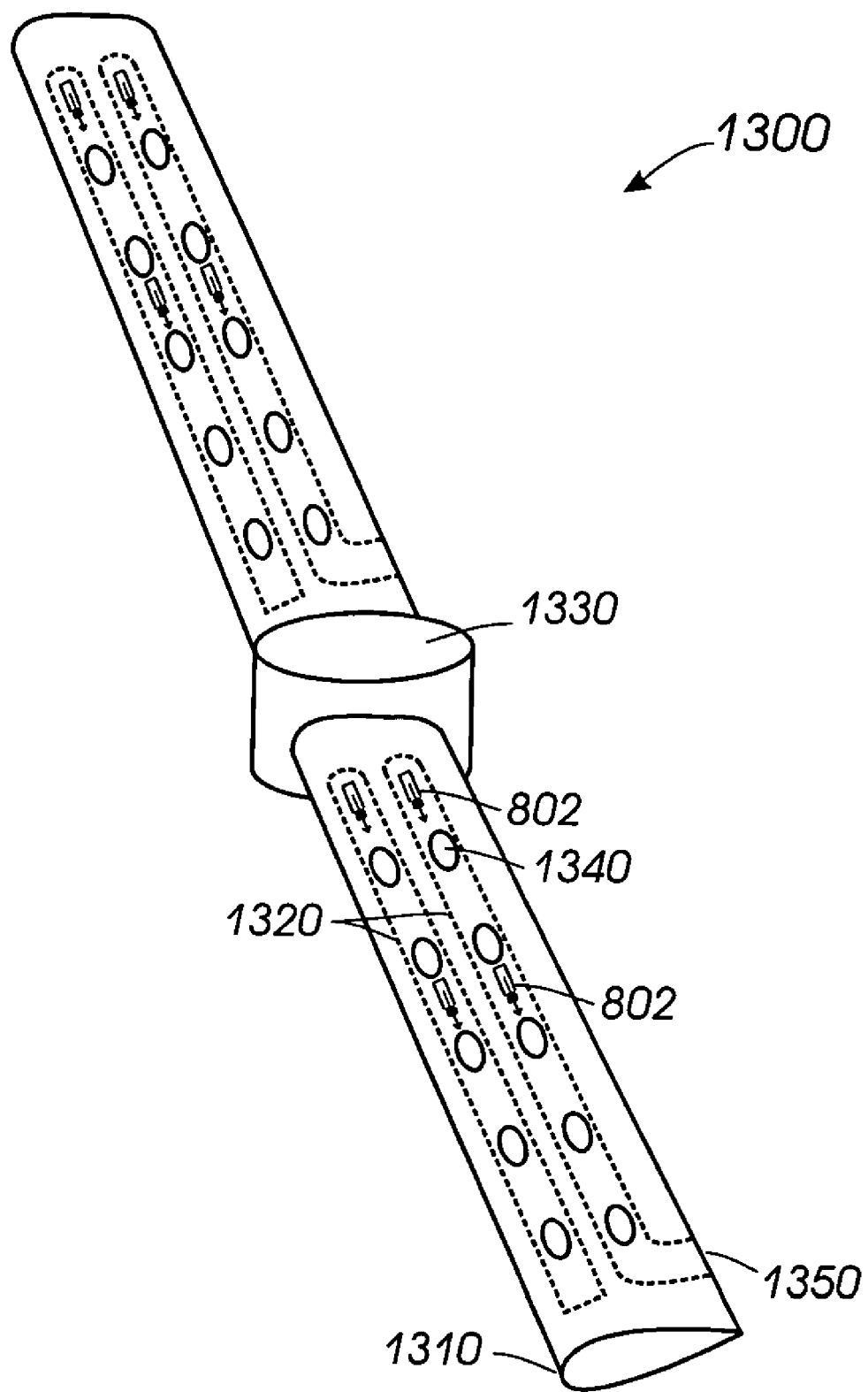
FIG. 13 is a perspective view of an embodiment of self-propelled rotor in which a plasma jet can be utilized.

Referring now to FIG. 13, a perspective view of an embodiment of self-propelled rotor 1300 is shown comprising an airfoil 1310, a first pulse detonation actuator 1320, and a hub 1330. Hub 1330 is coupled to airfoil 1310 and transmits force between an external shaft (not shown) and airfoil 1310 to rotate airfoil 1310. Fluid flow over the surface of airfoil 1310 generates a lift force. One or more pulse detonation actuators 1320 can be disposed inside airfoil 1310 and configured to detonate a fuel/air mixture to produce a pressure rise and velocity increase of combustion products inside pulse detonation actuator 1320. To modulate the lift force, airfoil 1310 has a plurality of lift control holes 1340 for communicating combustion product flows from pulse detonation actuators 1320 to the surface of airfoil 1320. To impart a thrust force to airfoil 1310 and thus a torque about an axis of hub 1330, first pulse detonation actuator 1320 comprises an exhaust nozzle 1350 for directing the combustion products overboard. Apparatus 1300 is thus a self-propelled rotor useful, for example, as a helicopter rotor. In some embodiments, exhaust nozzle 1350 is absent so that apparatus 1300 is a passive rotor useful, for example, in a turbine or compressor of a gas turbine engine. In other embodiments, hub 1330 is absent so that airfoil 1310 is useful, for example, as an aircraft wing or helicopter rotor blade.

The term "pulse detonation actuator" (PDA) refers to any device or system which produces both a pressure rise and velocity increase from a series of repeating detonations or quasi-detonations within the device. A "quasi-detonation" refers to a combustion process which produces a pressure rise and velocity increase higher than the pressure rise and velocity increase produced by a deflagration wave. Typical embodiments of PDAs 1320 comprise a means of impulsively igniting a fuel/air mixture, and a detonation chamber in which pressure wave fronts initiated by the ignition process coalesce to produce a detonation wave. The geometry of the detonation chamber is such that the pressure rise of the detonation wave expels combustion products out exhaust nozzle 1350. As used herein, "impulsively detonating" refers to a process of repeating detonations or quasi-detonations wherein each detonation or quasi-detonation is initiated either by external ignition (for example, spark discharge or laser pulse) or by gas dynamic processes (for example, shock initiation or autoignition).

One way to achieve a higher exhaust velocity is to increase the speed at which the fuel is burnt. The speed is increased by introducing turbulence and enhanced mixing in PDAs 1320. Plasma jets 802 can be included in PDAs 1320 to improve the fuel-air mixture for better combustion and introduce turbulence to increase flame speed.

Lift control holes 1340 are shaped and oriented to promote attachment of the boundary layer to the surface of airfoil 1310 so that the lift force is an increasing function of the combustion product flows. In an alternative embodiment, lift control holes 1340 are shaped to promote separation of the boundary layer from the surface of airfoil 1310 so that the lift force is a decreasing function of the combustion product flows.

In some embodiments, one or more PDAs 1320 can operate out of phase with other PDAs 1320. Out of phase operation raises the frequency with which combustion product pulses are delivered to the boundary layer and, in some applications, produces a temporally more uniform boundary layer compared to operation with a single PDA 1320.

Plasma jets 802 can also be used to cool heat-producing bodies, which is a concern in many different technologies, such as integrated circuits in single- and multi-chip modules (MCMs). Additionally, either zero net mass flow plasma jets 802, and/or open cavity plasma jets 200 such as shown in FIG. 2B can be implemented for any desired application, based on the mass flow available and other design considerations.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. For example, housing 109 can be formed by any suitable type of enclosure formed in independent structure as well as enclosures formed by surrounding structure(s). Additionally, any suitable component or combination of components can be used for controller 102, plasma generator 104, and electromagnetic accelerator 106 in any embodiments of plasma systems, such as systems 100 (FIG. 1), 200 (FIG. 2A), 300 (FIG. 3A), and 400 (FIG. 4), among others. The functionality and combinations of functionality of the individual modules can be reconfigured to provide any appropriate functionality. In the claims, unless otherwise indicated the article "a" is to refer to "one or more than one".

What is claimed:

1. A plasma jet system, comprising:
    a housing including one opening, wherein a partially ionized fluid is drawn into the opening;
    an electromagnetic accelerator configured to generate an electric field that accelerates the ionized fluid in the housing toward the opening in the housing, and to generate a magnetic field transverse to the electric field;
    a controller coupled to modulate the electromagnetic accelerator, thereby causing the ionized fluid to form a pulsed plasma flow through the opening in the housing; and
    a conductor configured to transport electrons to a location where the electrons collected in the enclosure are reinserted into the plasma flow.

2. The plasma jet system of claim 1, wherein the housing includes an electron beam window through which electron beams are supplied to further ionize the fluid in the housing.

3. The plasma jet system of claim 1, wherein the electromagnetic accelerator comprises a series of electrodes coupled to the housing, and the controller is operable to modulate electrical current to the electrodes to control an electric field generated by the electrodes.

4. The plasma jet system of claim 1, further comprising a structure, wherein the housing is configured in a structure so that the plasma flow mixes with a secondary fluid in the structure.

5. The plasma jet system of claim 1, further comprising:
a nozzle, wherein the housing is configured in the nozzle so that the plasma flow varies an effective throat area of the nozzle.

6. The plasma jet system of claim 1, further comprising:
a nozzle, wherein the housing is configured in the nozzle so that the plasma flow vectors the direction of thrust exiting the nozzle.

7. The plasma jet system of claim 1, further comprising:
an aerodynamic structure, wherein the housing is configured in the aerodynamic structure so that the plasma flow changes at least a portion of the effective shape of the aerodynamic structure.

8. The plasma jet system of claim 1, further comprising:
an aerodynamic structure, wherein the housing is configured in the aerodynamic structure so that the plasma flow affects the pressure on the aerodynamic surface by accelerating or decelerating the plasma flow.

9. The plasma jet system of claim 1, further comprising:
an aerodynamic structure, wherein the housing is configured in the aerodynamic structure so that the plasma flow creates forces and moments on the aerodynamic structure in reaction to the acceleration or deceleration of the plasma flow.

10. The plasma jet system of claim 9, wherein the aerodynamic structure comprises at least one of the group consisting of: an aircraft wing and an aircraft control surface.

11. The plasma jet system of claim 1, wherein the housing is configured in a structure so that the plasma flow cools at least a portion of the structure.

12. The plasma jet system of claim 1, wherein the structure is a pulse detonation actuator, and the plasma flow mixes a fuel-air mixture in the pulse detonation actuator.

13. A method comprising:
accelerating an ionized fluid through an electric field in a housing, wherein the housing includes one opening and the electric field is oriented to accelerate the ionized fluid in the direction of the opening, thereby forming a plasma flow;
generating a magnetic field transverse to the electric field, wherein the magnetic field decelerates electrons in the housing;
collecting decelerated electrons; and
transporting collected electrons to a location where the collected electrons are reinserted into the plasma flow.

14. The method of claim 13 further comprising:
pulsing the electric field at a predetermined frequency, thereby forming vortex rings of the plasma flow as the plasma flow exits the housing.

15. The method of claim 13 further comprising:
injecting electron beams into the housing to generate the plasma.

16. The method of claim 13, further comprising:
injecting the plasma flow into a primary flow to alter the direction of the primary flow.

17. The method of claim 13, further comprising:
using the plasma flow to perform at least one of the group consisting of:
altering the aerodynamic characteristics of a surface;
controlling aerodynamic forces and moments acting on a device in which the housing is installed;
mixing fuel and air in a device in which the housing is installed; and
controlling aerodynamic forces and moments acting on a device in which the housing is installed.

18. An apparatus comprising: an enclosure including one opening;
an electric field generator operable to generate an electric field in the enclosure;
a magnetic field generator operable to generate a magnetic field transverse to the electric field;
an ionized fluid source configured to provide ionized fluid in the enclosure, wherein the electric field is oriented to accelerate the ionized fluid toward the opening to generate a plasma jet; and
a conductor configured to transport the electrons to a location where electrons collected in the enclosure are reinserted into the plasma flow.

19. The apparatus of claim 18 further comprising:
a controller operable to control at least one of the group consisting of:
the electric field generator to provide a pulsed electric field;
the strength of the electric field generated by the electric field generator;
the ionized fluid source;
sequentially activate and deactivate a series of pairs of electrodes of opposite polarity; and
the strength of the electric field generated by the electric field generator.

* * * * *